US010951662B1

(12) United States Patent
Forte et al.

(10) Patent No.: US 10,951,662 B1
(45) Date of Patent: Mar. 16, 2021

(54) OPEN INTEGRATION FRAMEWORK FOR CYBERSECURITY INCIDENT MANAGEMENT SOFTWARE PLATFORM

(71) Applicant: DFLabs S.p.A., Milan (IT)

(72) Inventors: Dario Valentino Forte, Torre de' Picenardi (IT); Michele Zambelli, Cremona (IT); John Thomas Moran, Jr., Auburn, ME (US)

(73) Assignee: DFLABS S.P.A., Milan (IT)

( * ) Notice: Subject to any disclaimer, the term of this patent is extended or adjusted under 35 U.S.C. 154(b) by 0 days.

(21) Appl. No.: 16/675,524

(22) Filed: Nov. 6, 2019

(51) Int. Cl.
*H04L 29/06* (2006.01)
*G06F 21/55* (2013.01)

(52) U.S. Cl.
CPC ............ *H04L 63/205* (2013.01); *G06F 21/55* (2013.01); *G06F 2221/033* (2013.01)

(58) Field of Classification Search
CPC ...... G06F 21/55; G06F 2221/033; G06F 8/60; G06F 8/73; H04L 63/205
See application file for complete search history.

(56) References Cited

U.S. PATENT DOCUMENTS

| | | | | |
|---|---|---|---|---|
| 5,950,000 A | * | 9/1999 | O'Leary | G06F 8/38 717/105 |
| 6,957,426 B2 | * | 10/2005 | Bonilla | G06F 8/60 709/223 |
| 7,983,988 B2 | * | 7/2011 | Bouriant | G06Q 10/10 705/59 |
| 8,869,140 B2 | * | 10/2014 | Todorova | G06F 8/65 717/175 |
| 9,122,562 B1 | | 9/2015 | Stickle | |
| 9,426,180 B2 | | 8/2016 | Brookins et al. | |
| 9,805,206 B2 | | 10/2017 | Gounares | |
| 9,940,112 B2 | * | 4/2018 | Rajasekhar | H04L 67/16 |
| 10,084,804 B2 | | 9/2018 | Kapadia et al. | |
| 10,089,482 B2 | | 10/2018 | Skipper et al. | |
| 10,116,625 B2 | | 10/2018 | Kinder et al. | |

(Continued)

OTHER PUBLICATIONS

D3 Security, "D3 Security Achieves Certified Integration with McAfee Enterprise Security Manager ESM through the McAfee Security Innovation Alliance", Journal of Engineering, pp. 1-2 (Dec. 2018).

(Continued)

*Primary Examiner* — Linglan E Edwards
(74) *Attorney, Agent, or Firm* — Browdy and Neimark, P.L.L.C.

(57) ABSTRACT

In an open integration framework of a computerized cybersecurity incident management software platform, integrations are defined at an action level for integrating cybersecurity products for performing desired actions into the cybersecurity incident management software platform. High-level parameters of an integration are defined through an integration definition file. The integration definition file identifies a cybersecurity product to be called through an application program interface. One or more actions of the integration are defined through one or more respective action definition files that define details of the one or more actions. The action definition files identify the integration defined by the integration definition file, and the actions requiring use of the cybersecurity product through the application program interface.

16 Claims, 21 Drawing Sheets

(56) References Cited

U.S. PATENT DOCUMENTS

| | | | |
|---|---|---|---|
| 10,169,209 B2 | 1/2019 | McPherson et al. | |
| 10,346,158 B2 * | 7/2019 | Ghosh | G06F 8/70 |
| 10,412,117 B2 | 9/2019 | Forte et al. | |
| 10,432,631 B2 * | 10/2019 | Kaushal | H04L 63/10 |
| 10,439,884 B1 | 10/2019 | Forte | |
| 10,467,121 B2 * | 11/2019 | Natari | G06F 8/71 |
| 10,721,331 B2 * | 7/2020 | Smedberg | H04L 67/20 |
| 10,771,327 B2 * | 9/2020 | Bendre | H04L 67/1002 |
| 2003/0140333 A1 * | 7/2003 | Odaka | G06F 8/71 |
| | | | 717/115 |
| 2008/0098219 A1 | 4/2008 | Forte | |
| 2015/0379287 A1 | 12/2015 | Mathur et al. | |
| 2017/0098071 A1 | 4/2017 | Stopel et al. | |
| 2018/0020021 A1 | 1/2018 | Gilmore et al. | |
| 2018/0027006 A1 * | 1/2018 | Zimmermann | H04L 63/0227 |
| | | | 726/11 |
| 2018/0157485 A1 * | 6/2018 | Kugler | G06F 8/71 |
| 2018/0189517 A1 | 7/2018 | Larson et al. | |
| 2018/0349610 A1 | 12/2018 | Gupta et al. | |
| 2018/0373551 A1 * | 12/2018 | Christensen | G06F 9/44505 |
| 2019/0020665 A1 | 1/2019 | Surcouf et al. | |

OTHER PUBLICATIONS

PR Newswire, "stackArmor and Anchore Announce Strategic Partnership for Driving Docker Container Security and Compliance on AWS Cloud: stackArmor and Anchore to deploy and implement advanced container security and compliance solutions for regulated industries", stackArmor, Anchore, pp. 1-3 (Apr. 2018).

Nokia, "NetGuard Security Management" Nokia, pp. 1-6 (Feb. 2019).

\* cited by examiner

FIG. 5

```
script:
  type: python
  test_connection_code: |
    import json
    import argparse
    import requests
    import sys
    try:
        parser = argparse.ArgumentParser()
        parser.add_argument('--proxy_url', help='proxy_url', required=False)
        args, unknown = parser.parse_known_args()
        session = requests.Session()
        if args.proxy_url is not None:
            proxies = {'http': args.proxy_url, 'https': args.proxy_url}
        else:
            proxies = None
        searchURL = "https://cve.circl.lu/api/cve/CVE-2008-4250"
        r = requests.get(searchURL, proxies=proxies, timeout=(5, 60))
        if r.status_code != 200:
            exit(-1)
        else:
            exit(0)
    except Exception as e:
        sys.stderr.write(str(e))
        exit(-1)
docker_repo_tag: 'python3_generic:latest'
configuration:
  testable_connection: true
  require_proxy_config: true
```

FIG. 6

```
 1  integration: 'CIRCL CVE Search'
 2  name: 'Get CVE Details'
 3  type: Enrichment
 4  script:
 5    code: |
 6      import json
 7      import argparse
 8      import requests
 9      import sys
10      try:
11          parser = argparse.ArgumentParser()
12          parser.add_argument('--proxy_url', help='proxy_url', required=False)
13          parser.add_argument('--cve', help='cve', required=True)
14          args, unknown = parser.parse_known_args()
15          cve = args.cve.upper()
16          if cve.find("CVE") == -1:
17              cve = "CVE-" + cve
18          session = requests.Session()
19          if args.proxy_url is not None:
20              proxies = {'http': args.proxy_url, 'https': args.proxy_url}
21          else:
22              proxies = None
23          searchURL = "https://cve.circl.lu/api/cve/" + cve
24          r = requests.get(searchURL, proxies=proxies, timeout=(5, 60))
25          if r.status_code != 200:
26              exit(-1)
27          else:
28              json_data = json.loads(r.text)
29              print(json.dumps(json_data))
30              exit(0)
31      except Exception as e:
32          sys.stderr.write((str(e)))
33          exit(-1)
34  fields:
35    - id: cve
36      label: 'CVE'
37      type: text
38      required: true
```

```
166    - path : 'refmap.ms.[]'
167      type : text
168    - path : 'refmap.sectrack.[]'
169      type : text
170    - path : 'refmap.secunia.[]'
171      type : text
172    - path : 'refmap.vupen.[]'
173      type : text
174    - path : 'refmap.xf.[]'
175      type : text
176    - path : 'saint.[].bid'
177      type : text
178    - path : 'saint.[].description'
179      type : text
180    - path : 'saint.[].id'
181      type : text
182    - path : 'saint.[].osvdb'
183      type : text
184    - path : 'saint.[].title'
185      type : text
186    - path : 'saint.[].type'
187      type : text
188    - path : 'summary'
189      type : text
190    - path : 'vulnerable_configuration.[].id'
191      type : text
192    - path : 'vulnerable_configuration.[].title'
193      type : text
194    - path : 'vulnerable_configuration.[].cpe'
195      type : text
196    - path : 'vulnerable_configuration_cpe_2_2.[]'
197      type : text
198  table_view:
199    - display_name: 'ID'
200      value : 'id'
201    - display_name: 'CVSS'
202      value : 'cvss'
```

FIG. 9

OPEN INTEGRATION FRAMEWORK FOR CYBERSECURITY INCIDENT MANAGEMENT SOFTWARE PLATFORM

TECHNICAL FIELD

The field of this invention generally relates to an integration framework of a computerized cybersecurity incident management software platform.

BACKGROUND

Cybersecurity incident management platforms typically permit users to call application programming interfaces (APIs) associated with external providers as part of the process of performing desired actions within the platform. Frequently, very large integration files are created that call multiple APIs in order to provide the necessary code for integrating cybersecurity products for performing desired actions into a computerized cybersecurity incident management system.

One incident management system, into which the embodiments described herein may be incorporated as an open integration framework, is the DF Labs IncMan Suite, which is an incident management system that enables management of many kinds of information security incidents. The IncMan Suite supports the entire incident management process for every type of incident, including cybersecurity incidents, by supporting digital forensics, case management, and incident response.

Previous patent applications having at least one inventor in common with the present application, pertaining to cybersecurity incident management systems and digital evidence control systems, include U.S. patent application Ser. No. 11/784,794, filed Apr. 10, 2007 and published as U.S. Patent Publication 2008/0098219; U.S. patent application Ser. No. 14/521,328, filed Oct. 22, 2014 and issued as U.S. Pat. No. 10,412,117; and U.S. patent application Ser. No. 15/620,439, filed Jun. 12, 2017 and issued as U.S. Pat. No. 10,439,884. The entire disclosure of these previous patent applications naming at least one inventor of the present application are hereby incorporated herein by reference. It is contemplated that the system described herein may be used in connection with cybersecurity incident management, response, and security operation systems employing the subject matter described in the above-referenced previous patent applications by the inventor.

SUMMARY

It is an object of the invention to provide an integration framework of a computerized cybersecurity incident management software platform.

According to the apparatus and method of the invention, in an open integration framework of a computerized cybersecurity incident management software platform, integrations are defined at an action level for integrating cybersecurity products for performing desired actions into the cybersecurity incident management software platform. High-level parameters of an integration are defined through an integration definition file. The integration definition file identifies a cybersecurity product to be called through an application program interface. One or more actions of the integration are defined through one or more respective action definition files that define details of the one or more actions. The action definition files identify the integration defined by the integration definition file, and the actions requiring use of the cybersecurity product through the application program interface.

Because integrations are defined at the action level, if a user wants to use services or functionalities from two different companies on the cloud, or different functionalities from the same service, the user can create individual integrations for each functionality that are deployable as needed, rather than one large file that covers everything. Operating at the action level makes working with more complex integrations much more manageable and allows customers to easily extend, customize, and share integrations without the need to work with monolithic blocks of code and without concerns over breaking existing functionality. The open integration framework can allow users full visibility into the integration code as well as the ability to easily extend integrations. In addition to creating a more transparent integration development process, the open integration can allow users to easily share custom created integrations with a host of the cybersecurity incident management platform as well as with other users.

The integration definition file and each action definition file may be configured to be executed in a respective self-contained virtualization such as a Docker container. Thus, each action-level integration is executed in its own separate virtualization (Docker container) to enhance security and provide isolation and prevent conflicts between different libraries. Furthermore, instead of executing one very large integration file that would call multiple APIs, individual calls to APIs can be done separately in their own Docker containers.

Instructions in YAML may be used for calling the cybersecurity product through the application program interface. JSON may be used to pass data between the one or more actions and other internal components of the cybersecurity incident management software platform. The open integration framework may support defining the integration definition file and the one or more action definition files in Python, Perl, Powershell, or Bash, and defining the action definition files through use of one or more libraries associated with Python, Perl, Powershell, or Bash. Thus, the open integration framework can minimize requisite the technical knowledge required to be successful when creating new integrations: In particular, cloud-based security applications can be called to make queries or action requests in an automated fashion, and the instructions for such calls (in YAML) can then be individually configured and modified to the needs of the service provider and the user (in Pearl, Power Shell, Bash and Python), and multiple Docker containers (virtualizations of the action in the context of the API) can be added or subtracted as needed. Integrations can be defined in multiple supported languages (including Python, Perl, PowerShell and Bash). Users can utilize the common built-in libraries as well as any third-party libraries added for more complex use cases.

A user interface may be provided through which a user can add to the open integration framework the integration defined through the integration definition file and the one or more actions defined through the action definition file.

Although embodiments of the invention are directed to management and distribution of API integrations in the computer security space, the open integration framework could be employed more generally in other contexts.

The details of various embodiments of the invention are set forth in the accompanying drawings and the description below. Numerous other features and advantages of the invention will be apparent from the description, the drawings, and the claims.

DESCRIPTION OF THE DRAWINGS

FIGS. 5 and 6 are screen displays of portions of an integration definition file.

FIGS. 7-9 are screen displays of portions of an action definition file.

DETAILED DESCRIPTION

The present invention provides a system designed to stand independently on a platform of a cybersecurity incident management system, such as, for example, the IncMan incident management software platform available from DFLabs.

Figure 1:
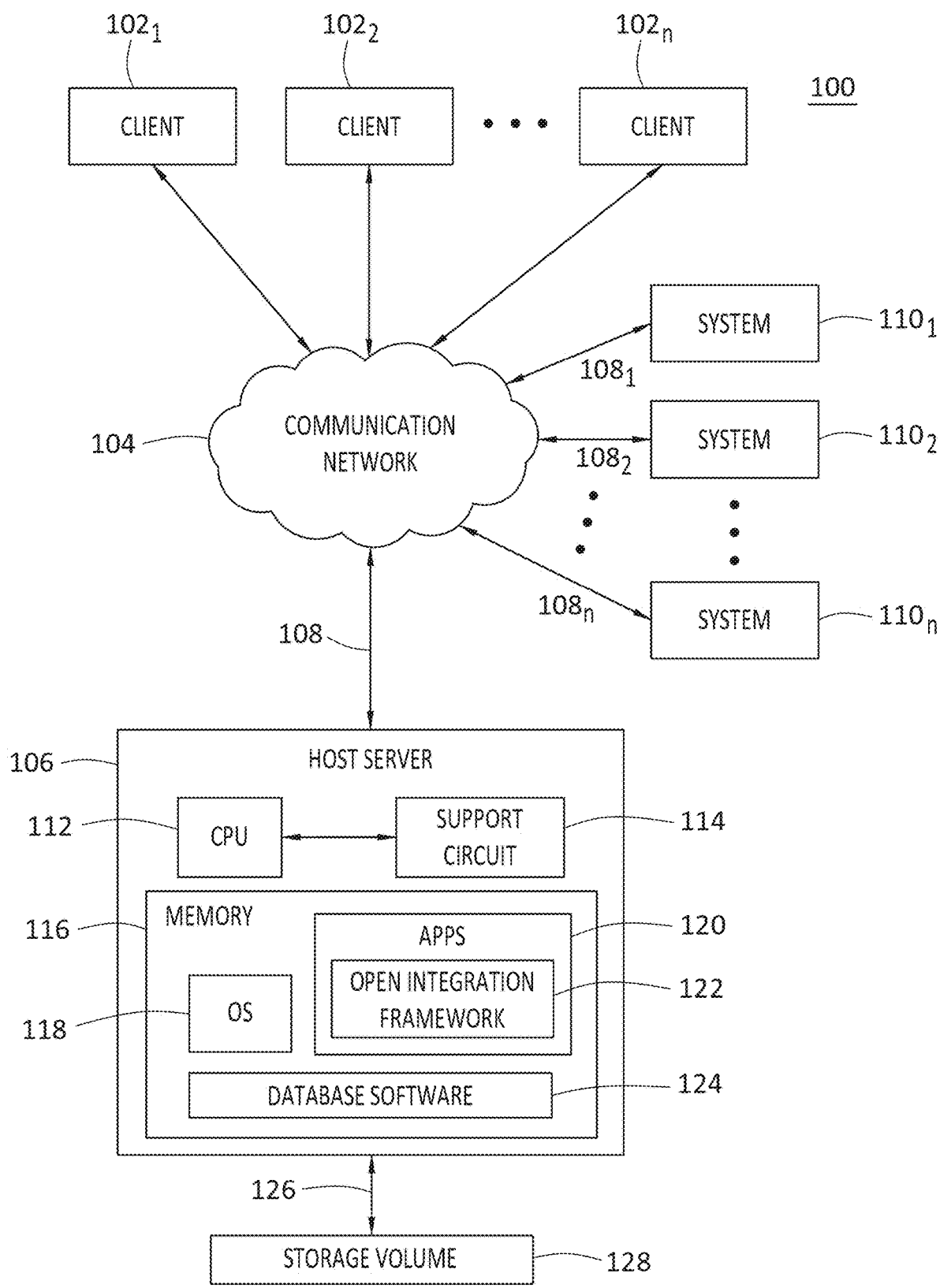
FIG. 1 is a schematic diagram of the hardware forming an exemplary embodiment of a computer system that operates in accordance with the present invention.

FIG. 1 is a schematic diagram of the hardware forming an exemplary embodiment of a computer system 100 that operates in accordance with the present invention and employs and executes the open integration framework of the present invention and the incident management system with which the open integration framework is associated. This figure portrays only one variation of the myriad of possible network configurations. The present invention can function in a variety of computing environments; such as, a distributed computer system, a centralized computer system, a stand-alone computer system, or the like. One skilled in the art will appreciate that computing system 100 may or may not contain all the components listed below.

The computer system 100 comprises a plurality of client computers $102_1, 102_2 \ldots 102_n$, which may connect to one another through a conventional data communications network 104. A host server 106 is coupled to the communication network 104 to supply application and data services as well as other resource services to the clients $102_1, 102_2 \ldots 102_n$. The communication network 104 is coupled to host server 106 via communication link 108. Similarly, systems $110_1, 110_2 \ldots 110_n$ are coupled to the communication network 104 via communication links $108_1, 108_2 \ldots 108_n$. The communication link $108_1, 108_2 \ldots 108_n$ may be a physical link, a wireless link, a combination there of, or the like. Systems $110_1, 110_2 \ldots 110_n$ may be another computer system, another communication network, a wireless device, or the like.

The host server 106 comprises at least one central processing unit (CPU) 112, support circuits 114, and memory 116. The CPU 112 may comprise one or more conventionally available microprocessors. The microprocessor may be an application specific integrated circuit (ASIC). The support circuits 114 are well known circuits used to promote functionality of the CPU 112. Such circuits include, but are not limited to, a cache, power supplies, clock circuits, input/output (I/O) circuits and the like. The memory 116 contained within the host server 106 may comprise random access memory, read only memory, removable disk memory, flash memory, and various combinations of these types of memory. The memory 116 is sometimes referred to main memory and may, in part, be used as cache memory or buffer memory. The memory 116 generally stores the operating system 118 of the host server 106. In addition, the memory 116 stores database software 108, various forms of application software 120, incorporating open integration framework 122 of the present invention, and database software 124. Application software 120 may also include all of the modules of an incident management system such as the DF Labs IncMan Suite described above. The operating system may be one of a number of commercially available operating systems. The database software 124 may comprise a relational database.

The communications network 106 may be coupled to the input/output (I/O) ports 126 of the host server 106. The I/O ports 126 are coupled to the storage volume 128. The storage volume 128 generally comprises one or more disk drives, or disk drive arrays, that may be used as a mass storage device for the host server 106 or systems $110_1, 110_2 \ldots 110_n$. The storage volume 124 may support a plurality of host servers 106 (only one of which is depicted).

To support the operation and functionality of the present invention, the memory 116 may be partially used as cache memory to temporarily store cached information. The open integration framework of the present invention may use the memory 116 for evidence control functions, such as, storing, viewing, editing, and the like.

Under normal operation, the host server 106 supports application programs 120, incorporating the open integration framework 122 of the present invention. In one embodiment, the open integration framework 122 allows for defining integrations on the host server 106. In addition, the open integration framework 122 enables defining integrations on a plurality of client computers $102_1, 102_2 \ldots 102_n$, in different locations.

The open integration framework 122 allows the definition of integrations at the action level. A simple integration definition file is used to define the high-level parameters of the integration such as name and possible configuration variables. Each action is then defined in a separate action file that defines the details of the action as well as the code and other parameters. Taken together, that is an integration.

The open integration framework is an open standard for defining integrations within the cybersecurity incident management platform that allows both a host of the platform and customers to define integrations using a common open plain text YAML format.

The integration framework allows users to develop and extend integrations using a common, open, and easy-to-use framework. For increased security and isolation, each integration is executed in its own Docker container, which can be customized by the user when the integration is created.

Integrations are defined using two types of text files. The first type, the integration definition file, is used to define calls to the product desired and to define the high-level parameters of the integration. This includes information such as the name of the integration, logo, connection parameters, test code, and the Docker container used to execute the actions. One integration definition file is required for each integration and serves as a container for all of the actions that the integration will perform.

The second type of file is an action definition file, which is used to define a single action that will be performed using the integration. Each integration action is defined in a separate action definition file, which will be associated with the appropriate integration definition. Action definition files are the files that contain the actual code that will be executed to perform the action. Use of built-in Linux and third-party libraries is enabled and all integrations are executed in Docker containers. Supported languages include Perl, Python, PowerShell and Bash. Users can easily make use of the common built-in libraries as well as any third-party libraries they might require to add for more complex use cases. In addition to the action code, action definition files also contain information such as the name, required and optional fields, and the format in which the resulting information will be displayed.

Figure 2:
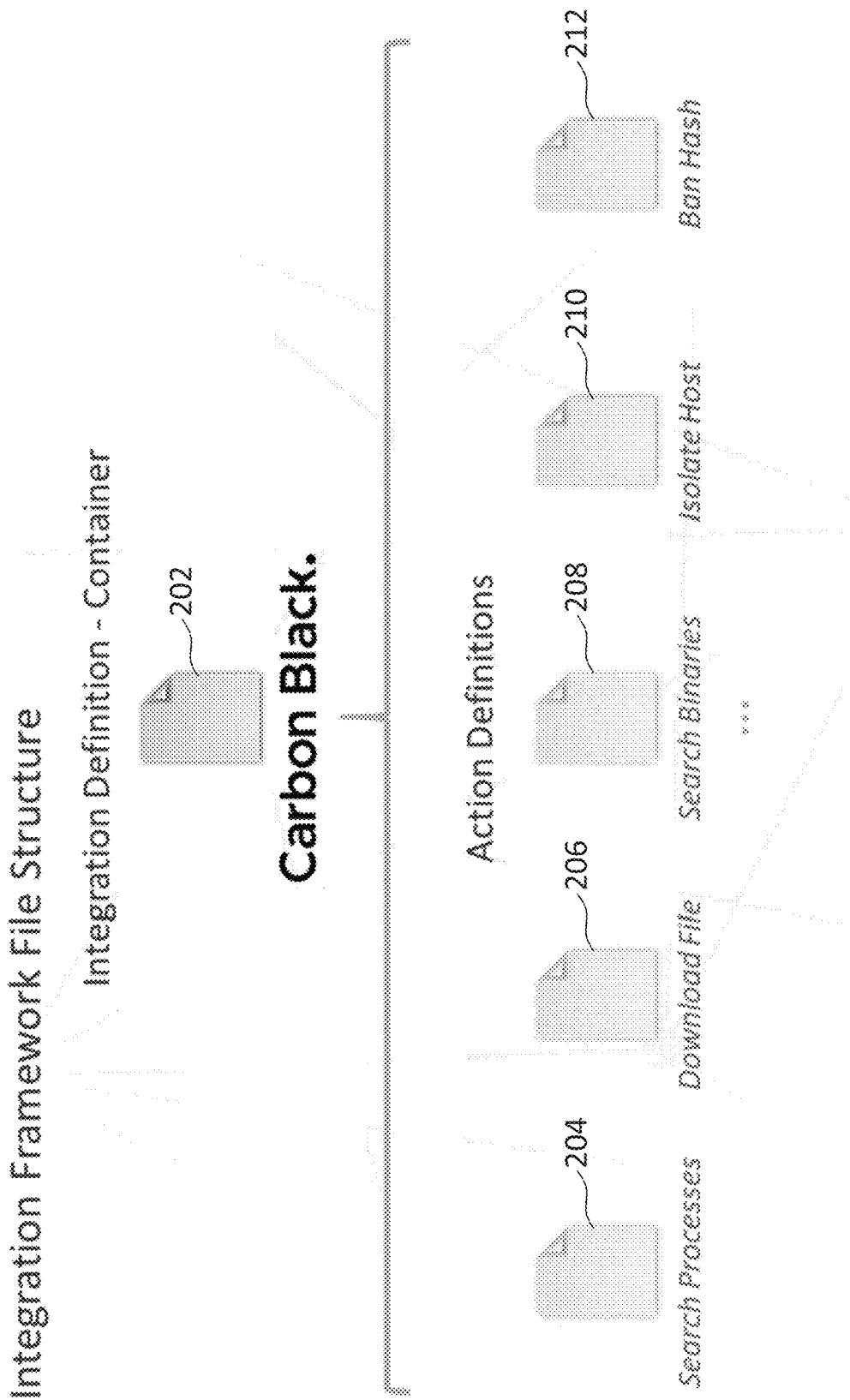
FIG. 2 is a schematic diagram of an integration framework file structure in accordance with the present invention.

FIG. 2 illustrates the high-level structure of an integration, in which integration definition file 202 defines an API that could be called and action definition files 204, 206, 208, 210, and 212 represent actions the user might want performed.

Defining integrations at the action level allows users greater flexibility in customizing existing integrations and sharing new actions with other users. For example, a user may choose to extend DFLabs's existing RSA Netwitness integration to include an additional action that retrieves all network connections for a given host. Once the user has created this new action, it can easily be added to the existing RSA Netwitness integration by uploading the new integration action file. This new action can also be shared between customers and used to extend the functionality of the integration in other customer instances as well.

Figure 3:
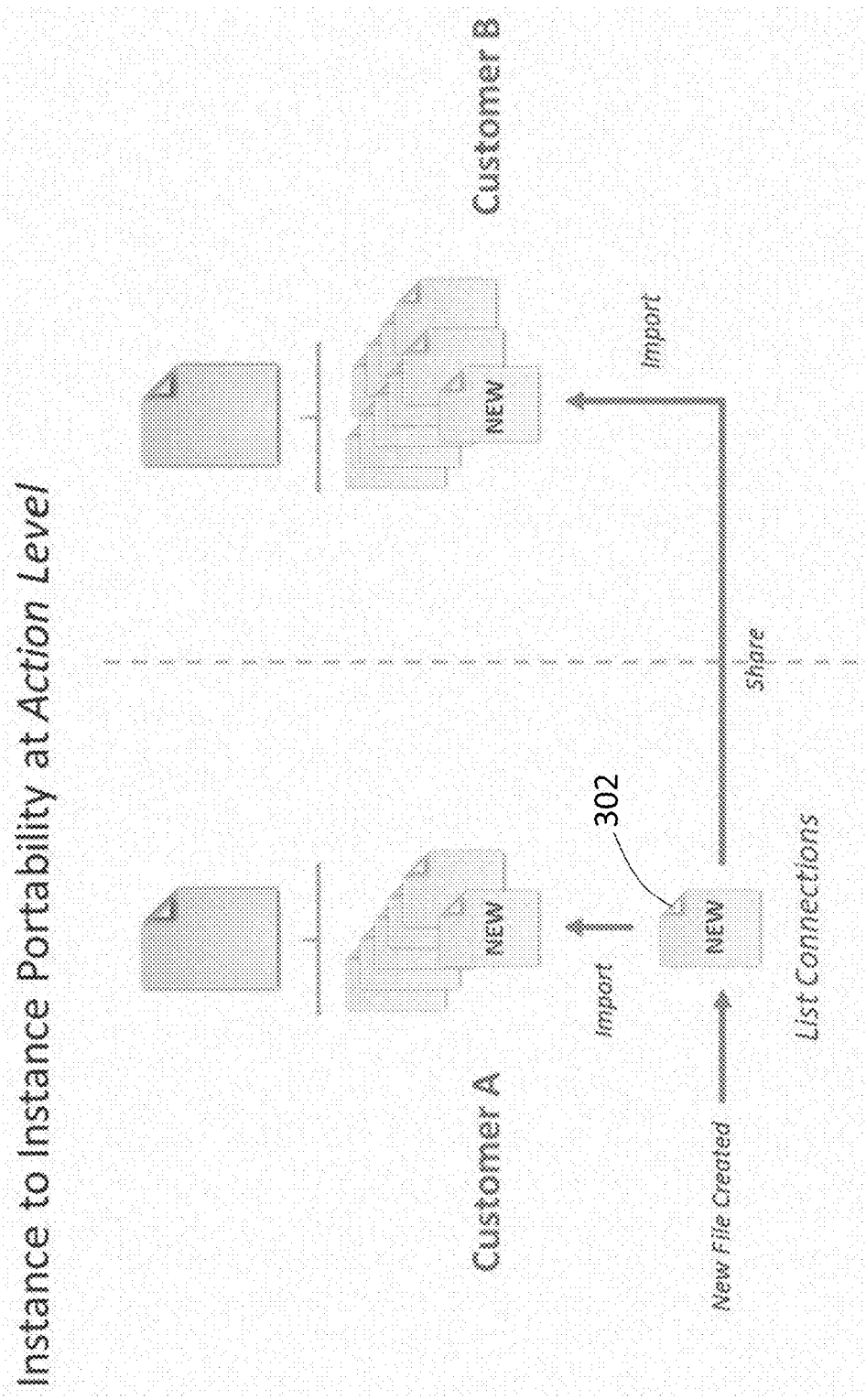
FIG. 3 is a schematic diagram illustrating instance-to-instance portability at the action level in accordance with the present invention.

FIG. 3 illustrates how defining files at the action level allows greater portability and customizability of integrations using the open integration framework. As is shown in FIG. 3, once an action definition file 302 is created it can easily be shared with other users. Specifically, the action definition file 302 can be sent to customer A or customer B as required. Pre-existing actions can be combined with other actions written internally and/or by other users to permit them to perform all the actions required for their use case with a minimal amount of reconfiguration.

Thus, operating at the action level makes working with more complex integrations much more manageable and allows customers to easily extend, customize, and share integrations without the need to work with monolithic blocks of code or concerns over breaking existing functionality. It is easy for customer A to extend an integration by defining a new action, adding it to the customer's existing version of the integration, and share it with customer B who may already have other custom actions for the same integration but can still import that because we're defining it at the action level.

Figure 4:
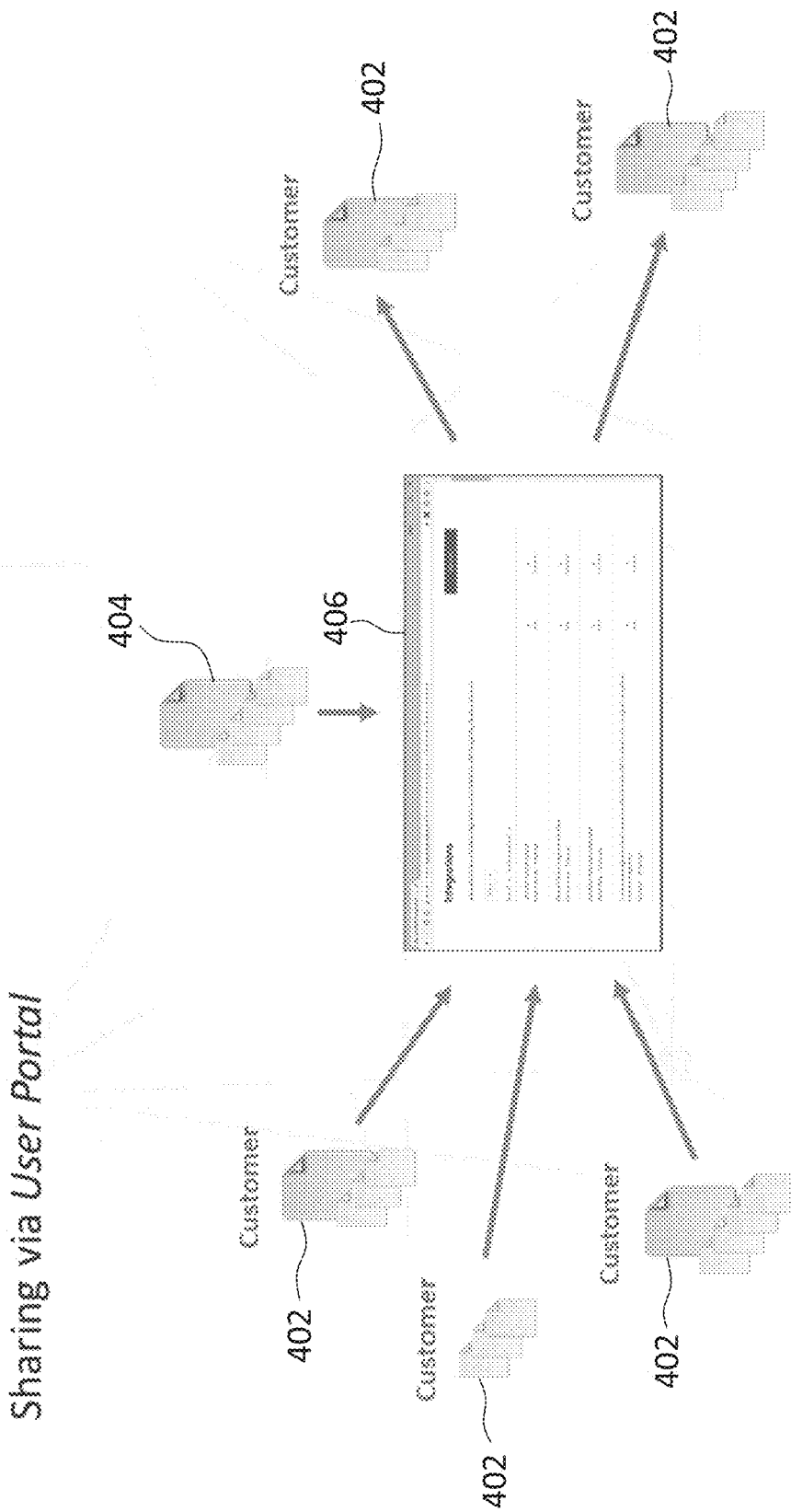
FIG. 4 is a schematic diagram illustrating sharing of integration files via a user portal in accordance with the present invention

FIG. 4 schematically illustrates how a user portal 406 serves as a hub for sharing all integration files. Multiple customers 402 can use hub 406 to upload, download, or browse actions others have uploaded. Integrations written by a host 404 of the cybersecurity incident management system platform, using the new integration framework, are available via user portal 406, or may be provided preinstalled within the cybersecurity incident management system platform. User portal 406 allows customers 402 to share integrations they have written with other customers who may also download and make use of them. Integrations written and shared by customers 402 via user portal 406 could be adapted for use and distribution by host 404 as part of the official distribution of the cybersecurity incident management platform, crowdsourcing some of the integration development.

In order to demonstrate the process, a specific example of creating an integration in this framework will be given with reference to FIGS. 5-9. It is intended that this example will help to illustrate creating integrations and help to provide deeper understanding of the process. However, it is to be understood that this is a possible example of a possible case of use and does not encompass the entirety of the framework's functionality.

Figure 5:
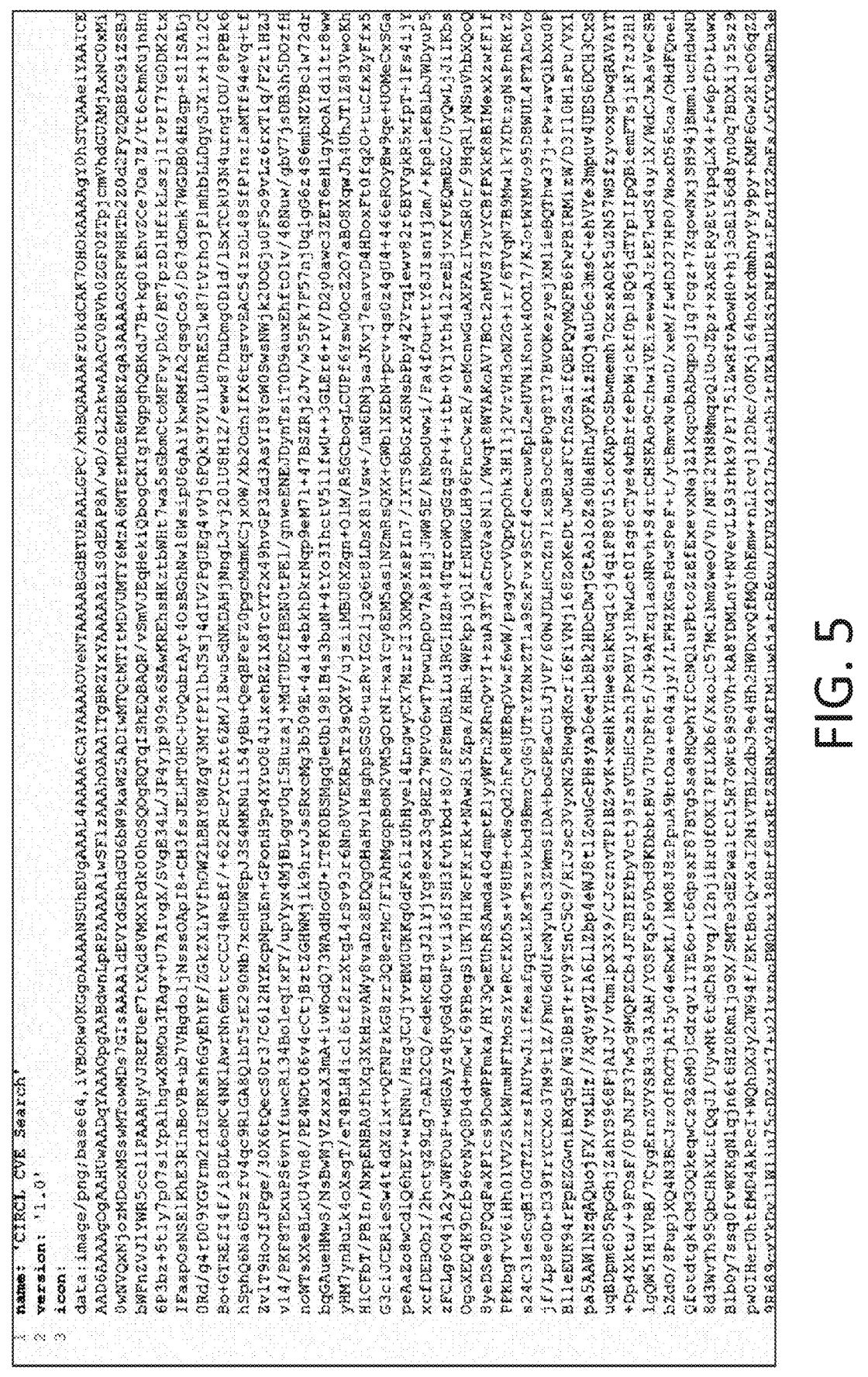

In this example, with reference to FIG. 5, consider an integration definition file that was created for the circle CVE search. Within the integration definition file are the container file for the integration, the integration name, a version number. There is an icon, base 64 encoded, that will be displayed within the cybersecurity incident management platform. Scrolling down to FIG. 6, the user in this case would see Python code for the test connection.

All of the action code is actually defined in individual action files. However, the framework also allows the ability to create test connection code. Thus, it allows the ability to test the configuration of the integration to verify that configuration parameters are correct and connection to the integration is possible. The test connection code itself, in this case, is defined in Python. The "testable_connection" flag is set to true and a "require_proxy_config" flag allows configuration of a proxy if need be. The final flag to consider in the integration definition file is the "docker_repo_tag." All integrations are executed in their own individual Docker containers.

The ability exists within the integration file to specify which Docker container this integration will execute with. The Docker container could also be specified within the graphical user interface if a Docker repo tag is not specified. Then, this specification would occur in the graphical user interface when the integration definition is uploaded.

Figure 8:
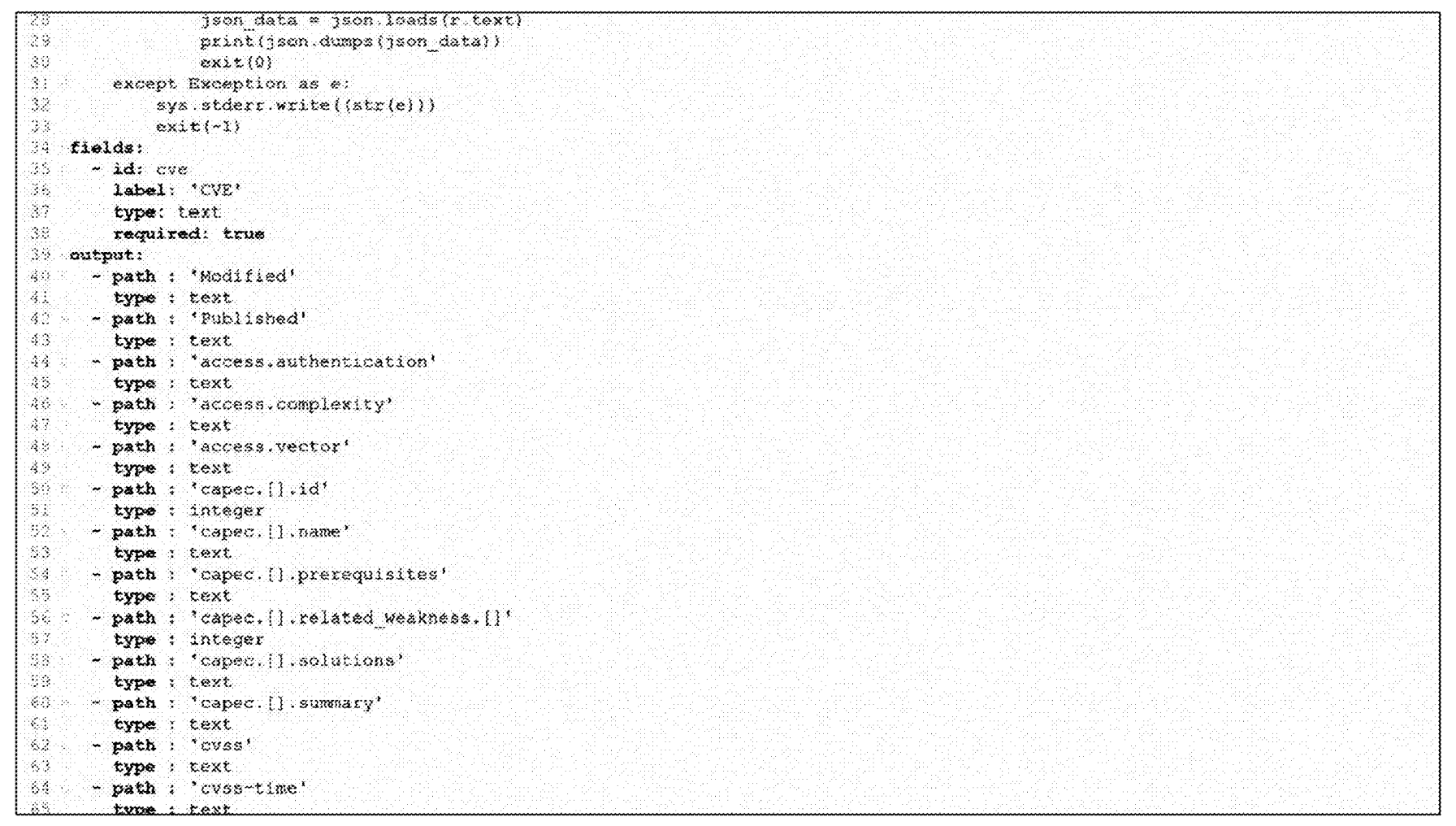

In this example, once the circle CVE integration is defined through an integration definition file at a high level, the user would start adding actual actions. FIGS. 7-9 present an example of an action definition file. At the top, as shown in FIG. 7, is the integration of "circle CVE search" that matches the integration definition file. In this case the type of action is "enrichment." This enrichment action is named "Get CVE Details," which is the purpose of the integration in this example.

This example action will contact "circle CVE search" and get CVE details from that repository. The script block in FIGS. 7-9 is the actual Python (in this case) code that goes out and actually queries the circle CVE database and returns that information, in this case in JSON, which allows parsing.

At this point, the user is able to define any other fields that are required. In the case of a CVE detail search, the only required field is the CVE identifier, i.e. the CVE number to be queried. In the action definition file, the user can create multiple fields as input and can make those either required or optional depending on the integration use case. Since there is a lot of potential output from the CVE search (see FIGS. 8 and 9), specifying the expected result, from this action, allows passing this information on to future integration actions, perhaps in a run book or another action that's inside the cybersecurity incident management platform. Even without knowing exactly what the results are going to be, expected fields can be passed on to future actions.

At the end of the action definition file (bottom of FIG. 9) the user has the ability to define a table view. The user can obviously view the raw JSON of any integration action that returns the JSON data, but it is possible to display it in a slightly more user-friendly view. The table view section allows the user to define a table and what fields he or she would like to display in that table (perhaps one of the most commonly used fields or what would be the most useful information for an analyst).

The integration definition file itself (an example of which is shown in FIGS. 5 and 6) has the following inputs ("*" indicates a required field):
  name: [String]* #Name of integration (should match action definition file);
    version: [String]* #File version number;
    icon: [Base64 String]* #Integration logo;
    script: *
    type: [String]* #Code type (python, perl, poweshell or bash);
    test connection code: |
      [String] #Code to test integration;
    docker_repo_tag: [String]* #Docker repository tag;
    docker_image_build_commands: [List] #Commands to execute when building;
    configuration: *
    testable_connection: [Boolean]* #Is test code present? (true/false);
    require_proxy_config: [Boolean]* #Is proxy available? (true/false);
    data attributes:* #Fields required for configuration
      <field_name>: [String]* #Name of field which will be passed to code;
      label: [String]* #Label displayed in the UI type: [String]* #Type of field;
      required: [Boolean]* #Is the field required? (true/false);
      validator: [String] #Input validator type;
      default: [String] #Default field value;
    values: [String] #List of possible values for a list field;
    listing_attributes: #Configuration fields to show in the resource table
      <field_name>: [String]* #Name of field which will be shown in the table;
      name: [String]* #Name displayed in the column header.
Notes on the above format follow.
Name: The name which will be displayed in the user interface. This should match the 'integration' field of each action definition file added to the integration.
Script:type: Indicates which code parser the incident management system should use to execute the code within the integration and action definition files. All action definition files for the integration must use the same code language as defined in the integration definition file. Acceptable values are: bash, perl, powershell, python.

Script:test_connection_code: Code that can be used to test the integration through the user interface by clicking on "Test Saved Settings." Exiting with a value of "0" indicates success, while any other value will indicate failure.

Docker_repo_tag: Docker repository tag of the image to build the new container from. It can be from any local or remote repository configured on the server of the incident management system.

Docker_image_build_commands: List of Docker commands to be executed upon container creation (for example, adding third-party libraries).

Configuration:require_proxy_config: True/false value indicating whether a proxy configuration tab should be available in the user integration for the integration. If the value is set to true and a proxy is configured in the user interface, the parameter 'proxy_url' will be passed to the code on execution.

Configuration:data_attributes: <field_name>: One <field_name> attribute should be added for each configuration parameter that will be required to configure the integration. For example, if a URL, user name, and password are required to connect to an integrated solution, the attributes configuration: data attributes: url, configuration: data_attributes: user_name and configuration: data_attributes: password should be added with their appropriate sub-attributes. The <field_name> parameters will be passed to the code on execution.

Configuration:data_attributes: <field_name>:type: Acceptable values are: checkbox, list, number, password, textarea, text.

Configuration:data_attributes: <field_name>:validator: Acceptable values are: url, ip, port, host, integer.

Configuration:data_attributes: <field_name>:values: List of possible values for a list field in key: value format, where the key is the value which will be used as the input parameter and the value is the display value which will be shown in the list. For example: values:
  ip: 'IP Address';
  domain: 'domain';
  url: 'URL.'
In the above example, if the user selected "IP Address" from the drop-down list, the value "ip" would be passed to the parameter at runtime.

It should be noted that the framework supports Python, Perl, Powershell and Bash and their associated libraries. Further, each action is isolated in its own Docker container (virtualization) in order to prevent library conflicts and enhance security and isolation.

In addition to creation of the integration, the action must be specified. The action definition input follows (* indicates a required field):
  integration: [String]* #Name of integration (should match integration definition file);
  name: [String]* #Name of action;
  type: [String]* #Type of action;
  script: *
  code: |* [String]* #Action code;
  fields: *
    id: [String]* #Name of field which will be passed to code at runtime;
    label: [String]* #Label displayed in the user interface;
    type: [String]* #Type of field;
    required: [Boolean]* #Is the field required? (true/false);
    validator: [String] # Input validator type;
    default: [String] #Default field value;
    values: [String] # List of possible values for a list field;

incident artifacts: [Boolean] #Allow use of incident artifact values for the field? (true/false);
observables: [String] #Link with the Observables section;
output_type: [String] #Type of output (json=default, or text);
output: * #Expected fields from results
path: [String]* #Result path;
type: [String]* #Type of data returned;
table_view: * #Results to display in table view
display_name: [String]* #Column name;
value:[String]* #Result path.

Notes on the action definition file format follow:

Integration: This should match the 'name field of the integration definition file for the integration.

Name: Name that will be displayed in the user interface. If the action name does not already exist, it will be added. However, for consistency and simplicity, it is recommended to use one of the existing names in the list of actions, such as "ban hash" or "system info."

Type: Type of action being performed. Acceptable values are: enrichment, containment, notification, daemon.

Fields:id: One id attribute should be added for each required or optional parameter that may be provided to the integration action at runtime. The name of the id attribute will be passed as a parameter to the code containing the dynamic value provided on execution.

Fields:id:type: Acceptable values are: list, text, upload, checkbox, fileDetonate, tag, multilist, textarea, datetime, number.

Fields:id:validator: Acceptable values are: ipaddress, port, integer, url, domain, e-mail, ip_domain, hash, datetime, sha256, md5, sha1.

Fields:id:values: List of possible values for a list or multilist field in key: value format, where the key is the value which will be used as the input parameter and the value is the display value which will be shown in the list. For example: values:
ip: 'IP Address';
domain: 'domain';
url: 'URL.'

In the above example, if the user selected "IP Address" from the drop down list, the value "ip" would be passed to the parameter at runtime.

Fields:id:incident_artifacts: When set to "true," incident artifact values such as "sourceAddress" can be used as inputs for the field.

Fields:id:observables: This field defines the link between the action and the observables section. Specifying an observable type here will cause the action to be displayed in the Actions menu for the specified observable type. Acceptable values are: ipaddress, url, userdetail, md5, sha1, sha256, domain, file, email.

Output_type: The type of output returned by the action, either 'text' or 'json'. If the output_type is not specified, 'json' is assumed. If the output_type is 'text', the table_view section will be ignored and the table view will not be displayed in the cybersecurity incident management platform.

Output: The output expected from the action: '[raw_result]' will show the raw output from the action, or individual JSON fields can be specified using the subattributes below. To use the results in future actions, individual JSON fields must be specified.

Output:path: JSON path for each field that may be returned by the action, beginning with the path ""; using the following JSON as an example:

{
country: "US",
response_code: 1,
as_owner: "CloudFlare, Inc.",
detected_urls:
{
url: "http://google.com/",
positives: 2,
}
the following output:path attributes should be added:
country;
response_code;
as_owner;
detected_urls.[ ].url;
detected_urls.[ ].positives.

Output:path:type: Reserved for future use. All outputs are treated as strings.

Table_view: The results from the action which will be displayed in a table view within the cybersecurity incident management system; '[raw_result]' will show the raw output from the action, or individual JSON fields can be specified using the subattributes below.

Table_view:display_name: Name which will appear as the column name.

Table_view:value: JSON path for each field which may be returned by the action, beginning with the path " "; see output:path field above for additional information.

Signature: Used by the cybersecurity incident management platform to sign official integrations.

It should be noted that the framework supports hash functions such as md5, sha1. and sha256.

Once an integration is created, the cybersecurity incident management platform primarily uses JSON to pass data between actions and other internal components. There is no requirement that integrations return JSON results; integrations will execute regardless of the data or data type they return. However, in order to pass data returned from an action to a future action in a run book or to other internal components, the output from an integration action must be returned in JSON and the JSON fields must be defined in the output:path attributes of the action definition file.

Most APIs can return JSON data, either by default or as an option. If an integration does not return JSON natively, the returned data may be converted to JSON prior to being returned by the action code so long as it matches the structure specified in the output:path attributes of the action definition file.

For example, to return JSON data using Python, the output should be printed as follows:
Import json
. . .
print(json.dumps(<JSON Data>)).

The cybersecurity incident management platform will use the exit status of the code to determine the success or failure of the action. If the code exits with a status of '0,' the action will be shown as successful. Any other exit status will be shown as a failure. For example, in Python:
exit(0) #Success
exit(1) #Failure.

Output from each integration action can be viewed in either Table view or JSON view when executed. Table view is used to display a subset of the data, defined in the action definition file "table_view:" attributes listed above, in a table format. For example, the following code in an action definition file would result in a Table view with columns for "ID", "CVSS", "A", "C", and "I"

table_view:
  display_name: 'ID'
  value: 'id'
  display_name: 'CVSS'
  value: 'cvss'.

JSON view will display the entire output of the integration action in JSON format.

Figure 10:
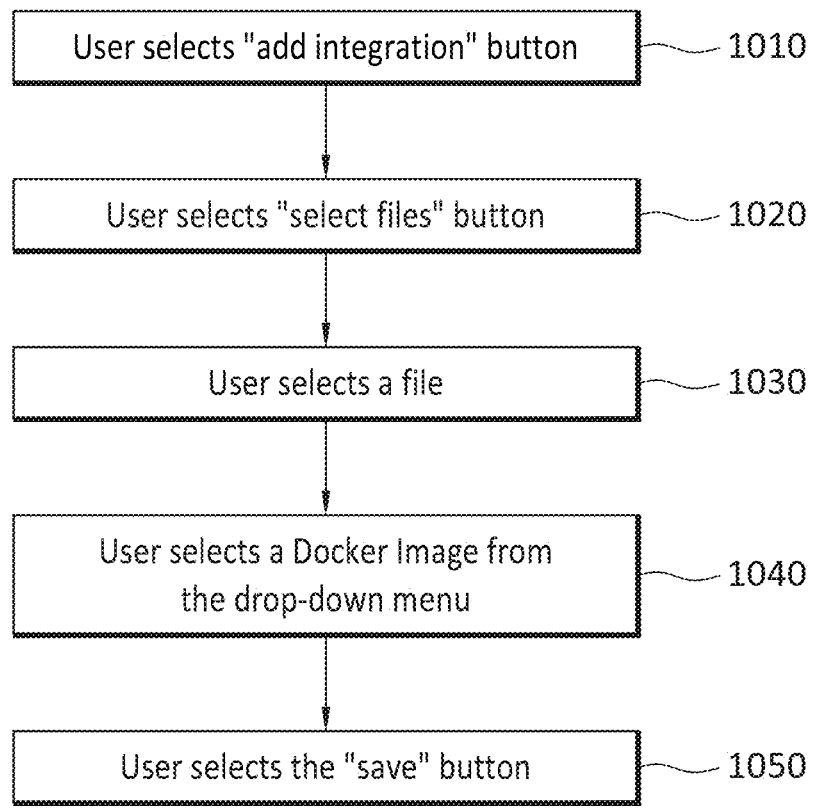
FIG. 10 is a flowchart of the process of adding an integration.
Figure 11:
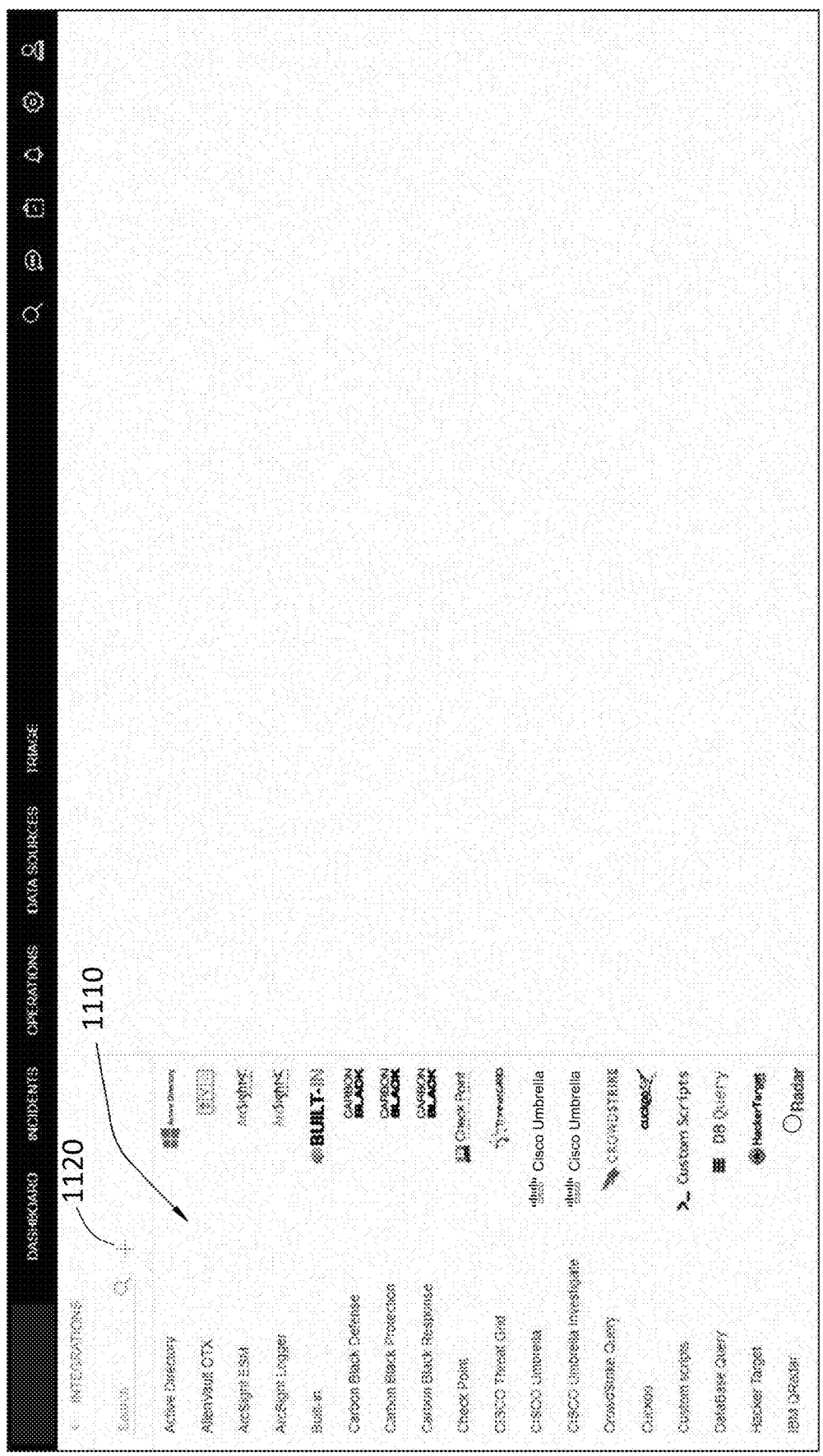
FIG. 11 is a screen display of an integrations page, for creating an integration.
Figure 12:
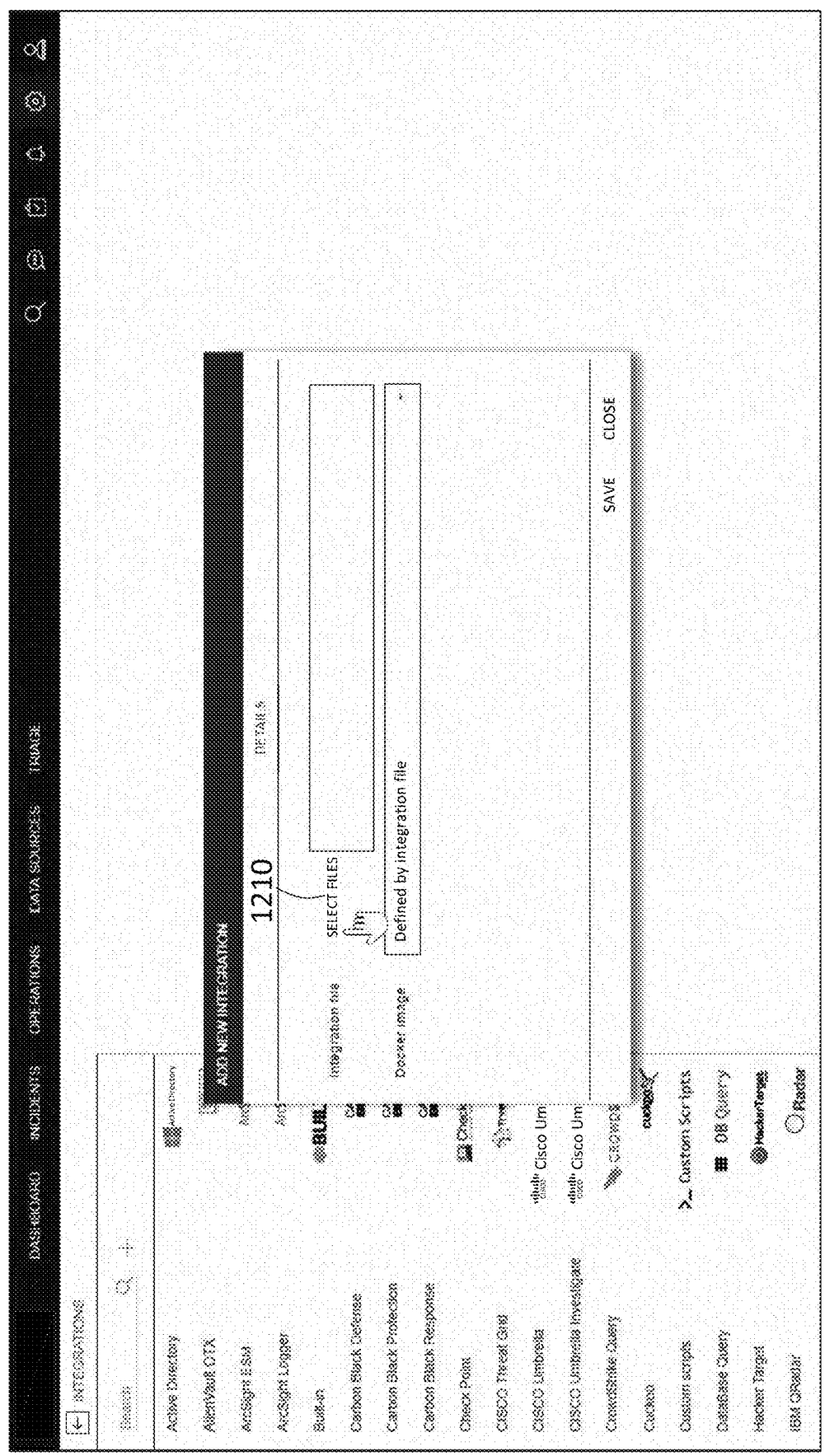
FIG. 12 is a screen display showing an add new integration window.
Figure 13:
FIG. 13 is a screen display of a window for enabling selection of an integration file.

Once the user has defined an integration through an integration definition file, and created an action through an action definition file, within the cybersecurity incident management platform, it is easy to quickly add that integration and execute actions. The flowchart of FIG. 10 and the screen displays of FIGS. 11-15 illustrate the process of adding an integration. All integrations are configured by navigating within the user interface to Configurations→External Sources→Integrations from the Main Manu bar of the user interface. The user is presented with the integrations page of FIG. 11, which is the screen the user would use to create a new integration. Integration list pane 1110, on the left-hand side of the integrations page, lists various callable APIs. Adding an integration is as simple as clicking on the add new integration "+" icon 1120 at the top of integration list pane 1110 of the integrations page of FIG. 11 (step 1010 of FIG. 10). The add new integration window of FIG. 12 allows the user to upload an integration definition file by clicking "select files" button 1210. Once the user selects "select files" button 1210 as shown in FIG. 12 (step 1020 of FIG. 10), the user is prompted, in FIG. 13, to select a file (step 1030 of FIG. 10). FIG. 13 shows the user in one particular case selecting the circle CVE file.

Figure 14:
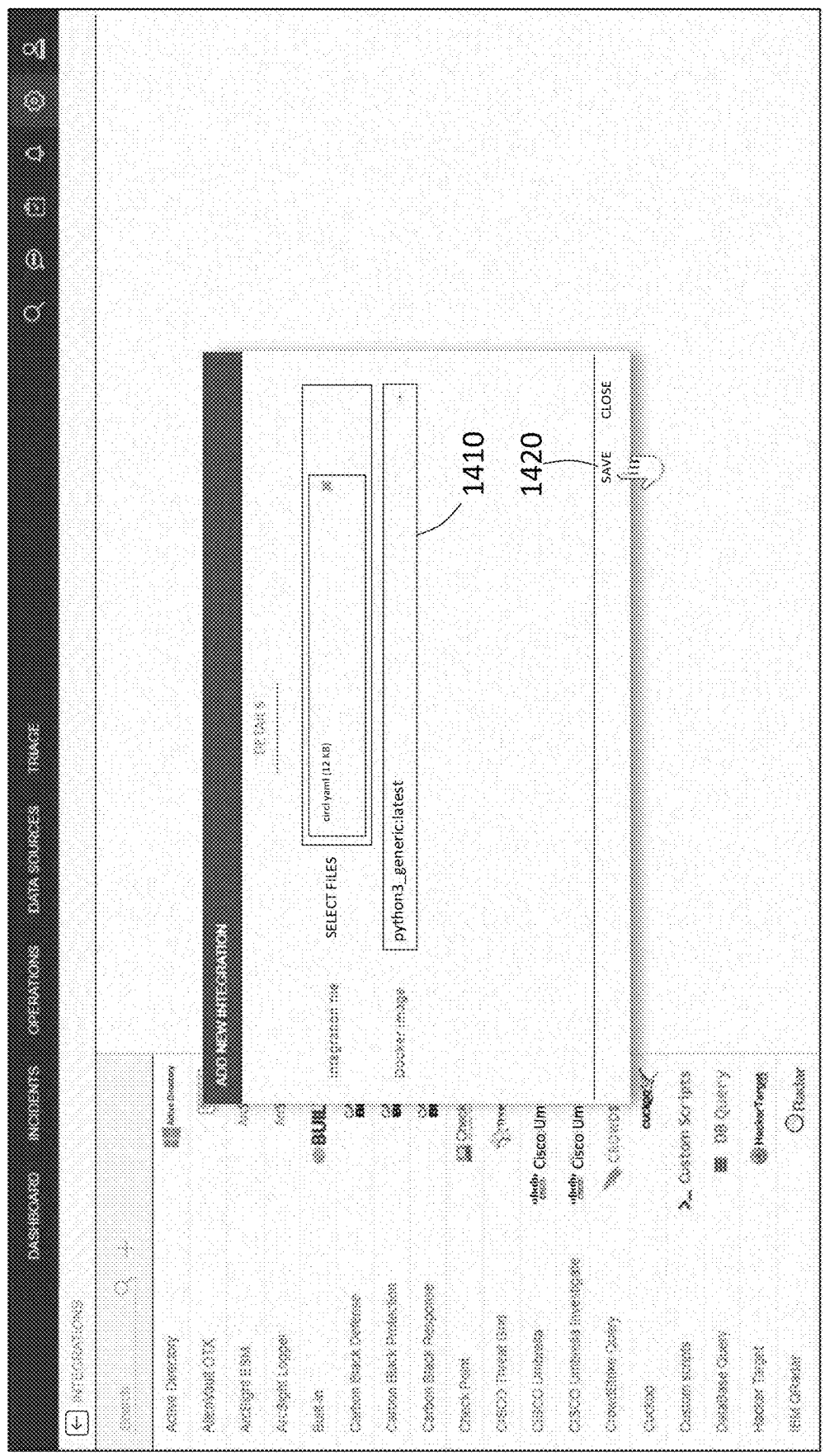
FIG. 14 is another screen display of the add new integration window.
Figure 15:
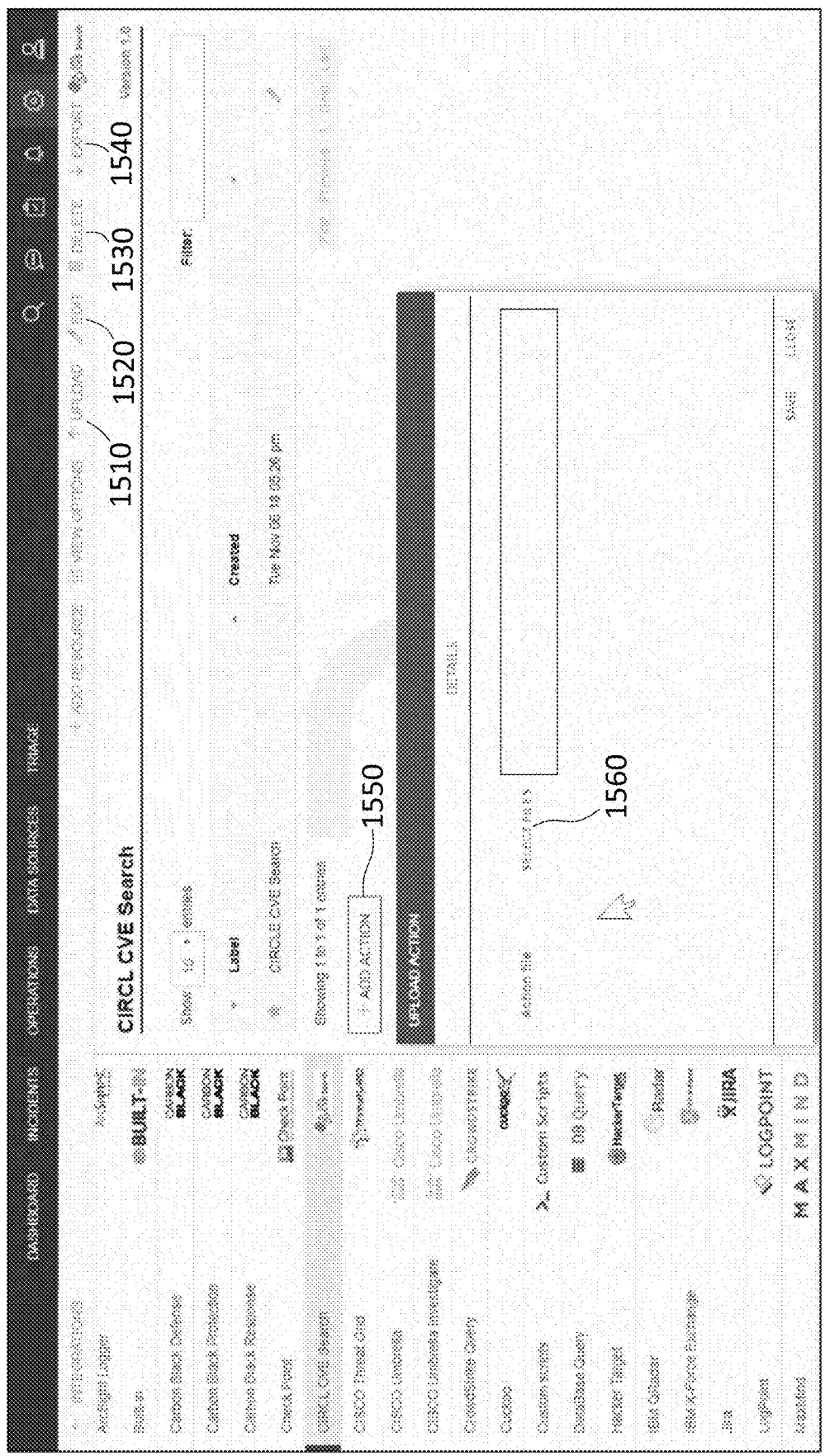
FIG. 15 is a screen display showing an add new action window.

The user must select a Docker image that will be used to create a new container for the new integration. If the integration definition file contains a "docker_repo_tag"' line, the Docker_repo_tag identifies the integration definition file. As is shown in FIG. 14, the user has the option to either use the Docker_repo_tag specified in the integration definition file, or to look at all the other Docker images that are already present in the cybersecurity incident management platform through drop-down menu 1410 and decide to use one of those Docker images instead (step 1040 of FIG. 10). If the user wishes to use the Docker image associated with "docker_repo_tag" as the base for the container, the user selects "Use YAML 'docker_repo_tag'" from the Docker image dropdown 1410. Otherwise, the user selects an existing Docker image from the Docker image dropdown 1410. Once the integration definition file is specified, and the Docker image is defined and added, saving the integration itself is as simple as clicking "save" button 1420 (step 1050 in FIG. 10). The file is parsed and the file will be added as a new integration to the cybersecurity incident management platform, as is shown in the left column of FIG. 15. FIG. 15 also includes an upload button 1510, an edit button 1520, a delete button 1530, and an export button 1540 for uploading, editing, deleting, or exporting integration files. Thus, for example, to edit an existing integration by uploading a new integration definition file or changing the Docker container in which the integration actions execute, the user first clicks on the "edit" button 1520 in the upper right-hand corner of the page. To export the integration definition file for the selected integration, the user first clicks on the "export" button 1540 in the upper right-hand corner of the page.

Figure 16:
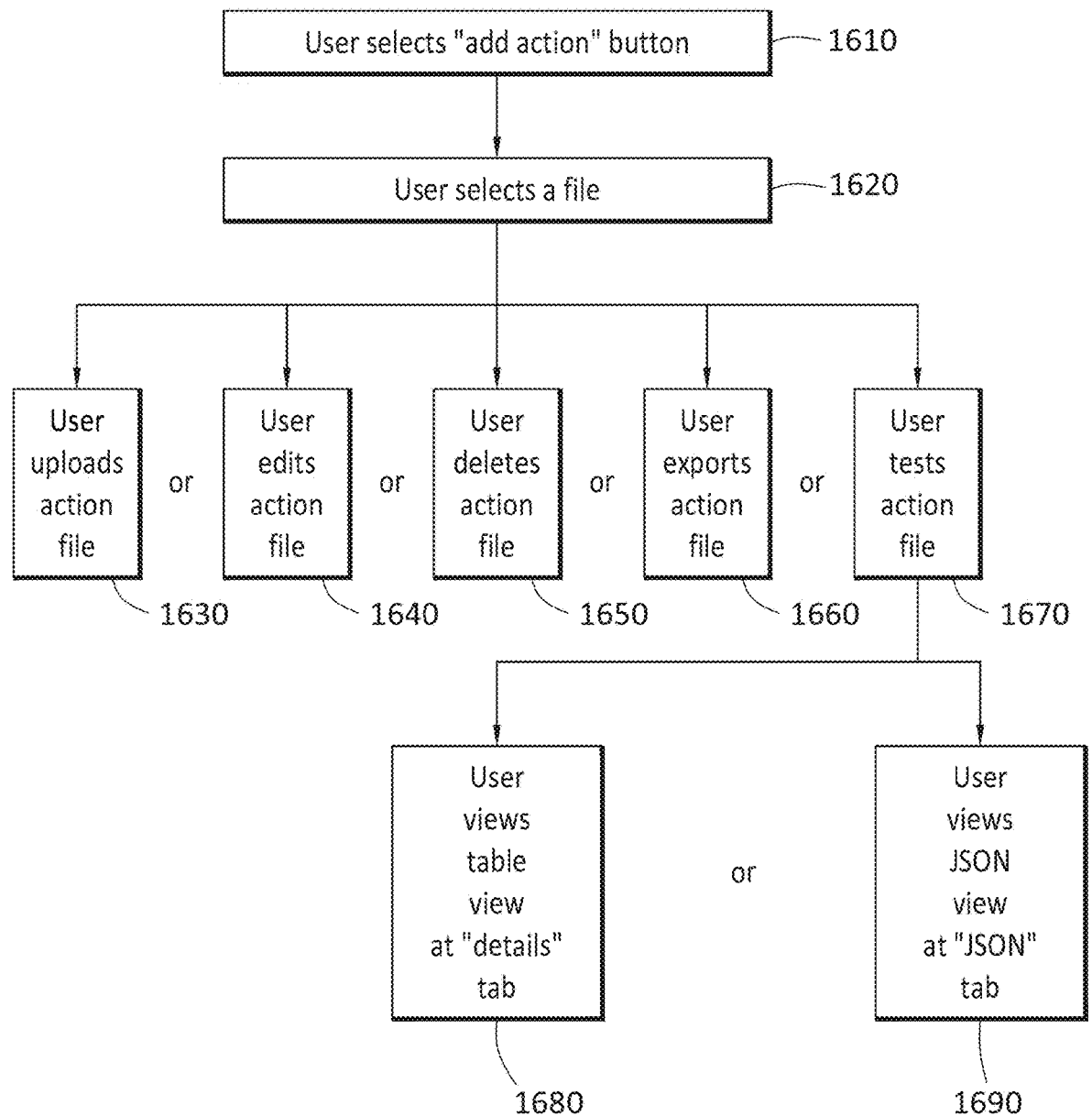
FIG. 16 is flowchart of the process of adding a new action.
Figure 17:
FIG. 17 is a screen display of a window for enabling selection of an action file.
Figure 18:
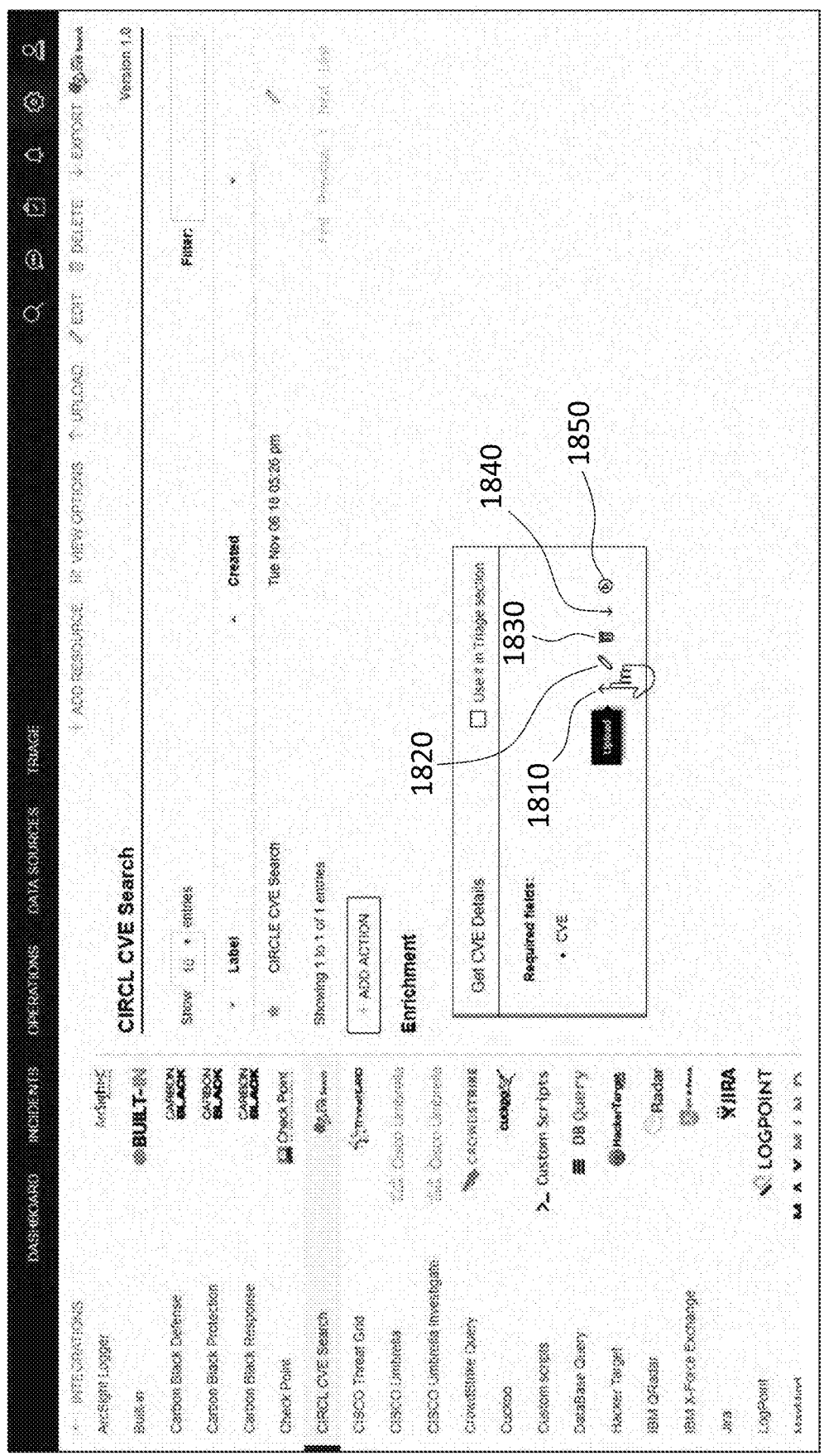
FIG. 18 is a screen display of a window enabling uploading, editing, deletion, downloading, or testing of an action file.

Once the integration is defined and configured through the integration definition file, a specific action must be added, as is illustrated in the flowchart of FIG. 16 and the screen displays of FIGS. 15 and 17-21. The add new action window of FIG. 15 allows the user to upload an action definition file. The user clicks an "add action" button 1550 in FIG. 15 (step 1610 in FIG. 16) and then clicks a "select files" button 1560. In this case, the user selects an action definition file by selecting the "circle CVE details" action file in FIG. 17 and then clicks "save" to add the new action (step 1620 in FIG. 16). That action file will be automatically parsed and a new action, "Get CVE Details," is created with the one required field, CVE. As is shown in FIG. 18, numerous options are available for each integration action. Existing actions may be edited by clicking upload icon 1810 below the action name to upload a new action definition file, or by clicking edit icon 1820 below the action name to open a text editor and edit the action directly within the cybersecurity incident management platform. Thus, a user could select upload icon 1810 to upload a new action file to overwrite the existing one (step 1630 in FIG. 16), or select edit icon 1820 to edit that action file right within the cybersecurity incident management platform (step 1640) by editing the code of an action within an action editor. The user can also select delete icon 1830 to delete the action if it's no longer needed (step 1650), or select export icon 1840 to export the action file (step 1660). Before the action is exported and shared with other users, the user can select text icon 1850 to test the action file (step 1670). Thus, the screen of FIG. 18 also allows the user to upload, edit, download, test, and delete an action as well as add an entirely new action.

Figure 19:
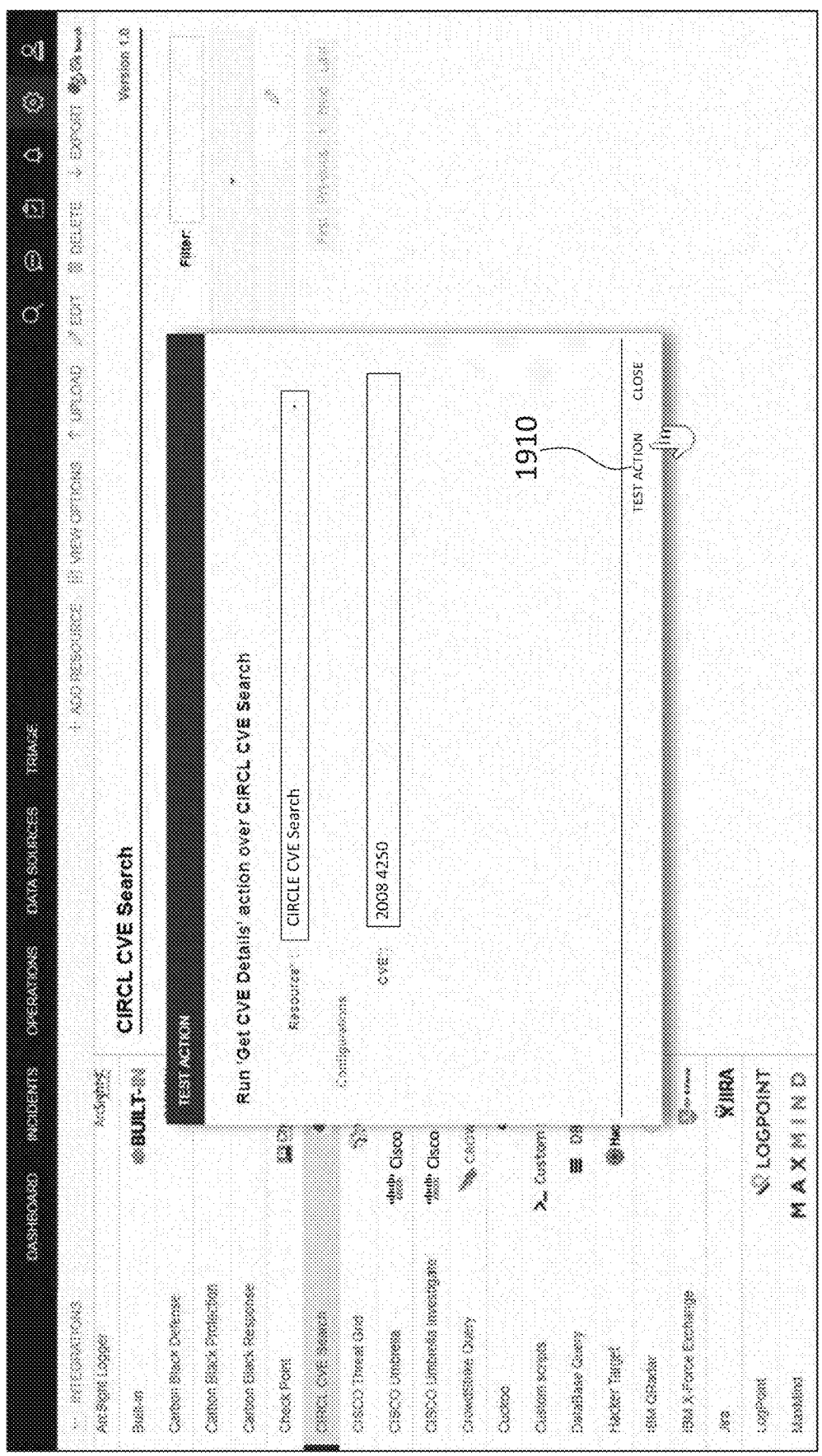
FIG. 19 is a screen display of a test action window.
Figure 20:
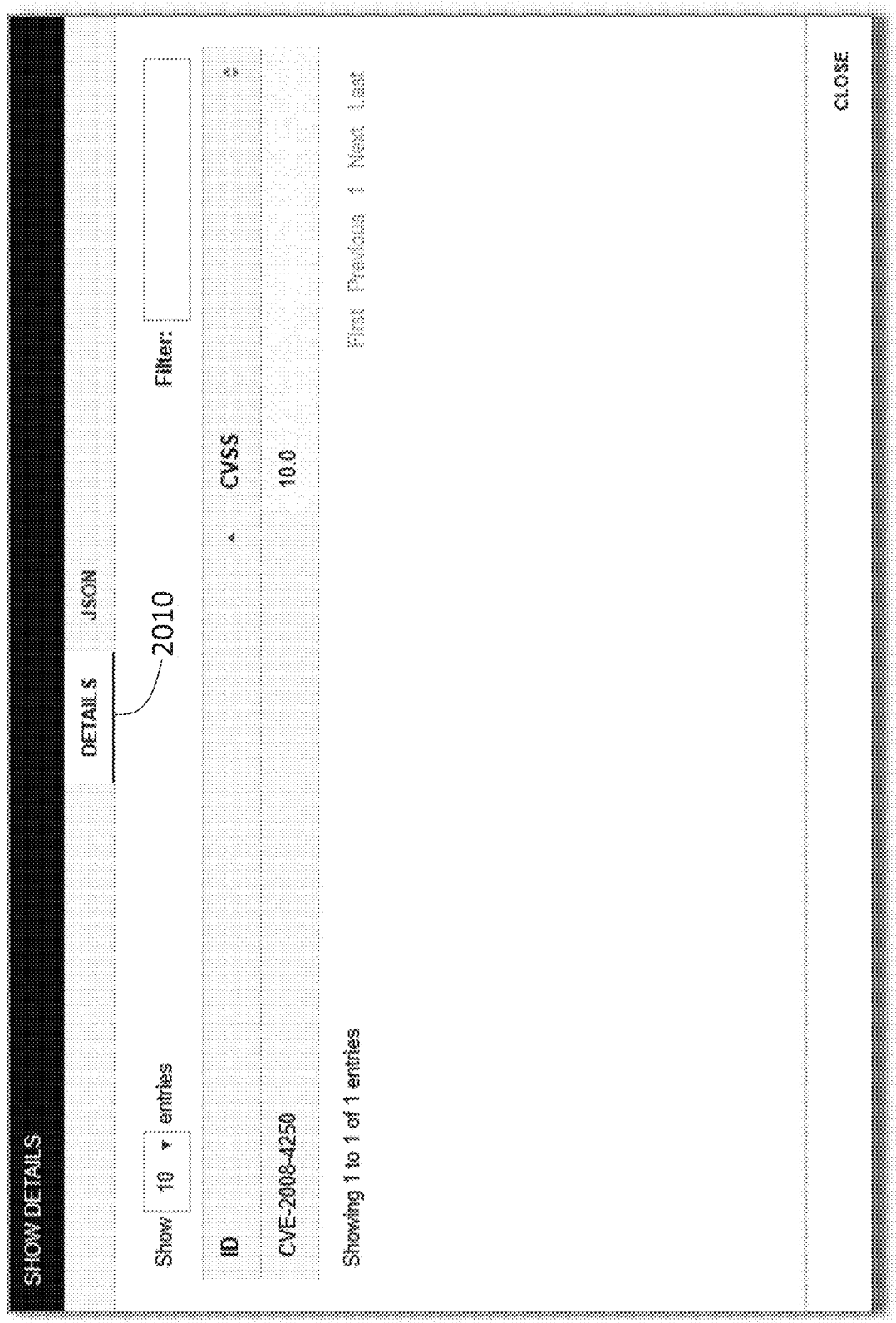
FIG. 20 is a screen display of a details tab of a show details window that shows details of an action.
Figure 21:
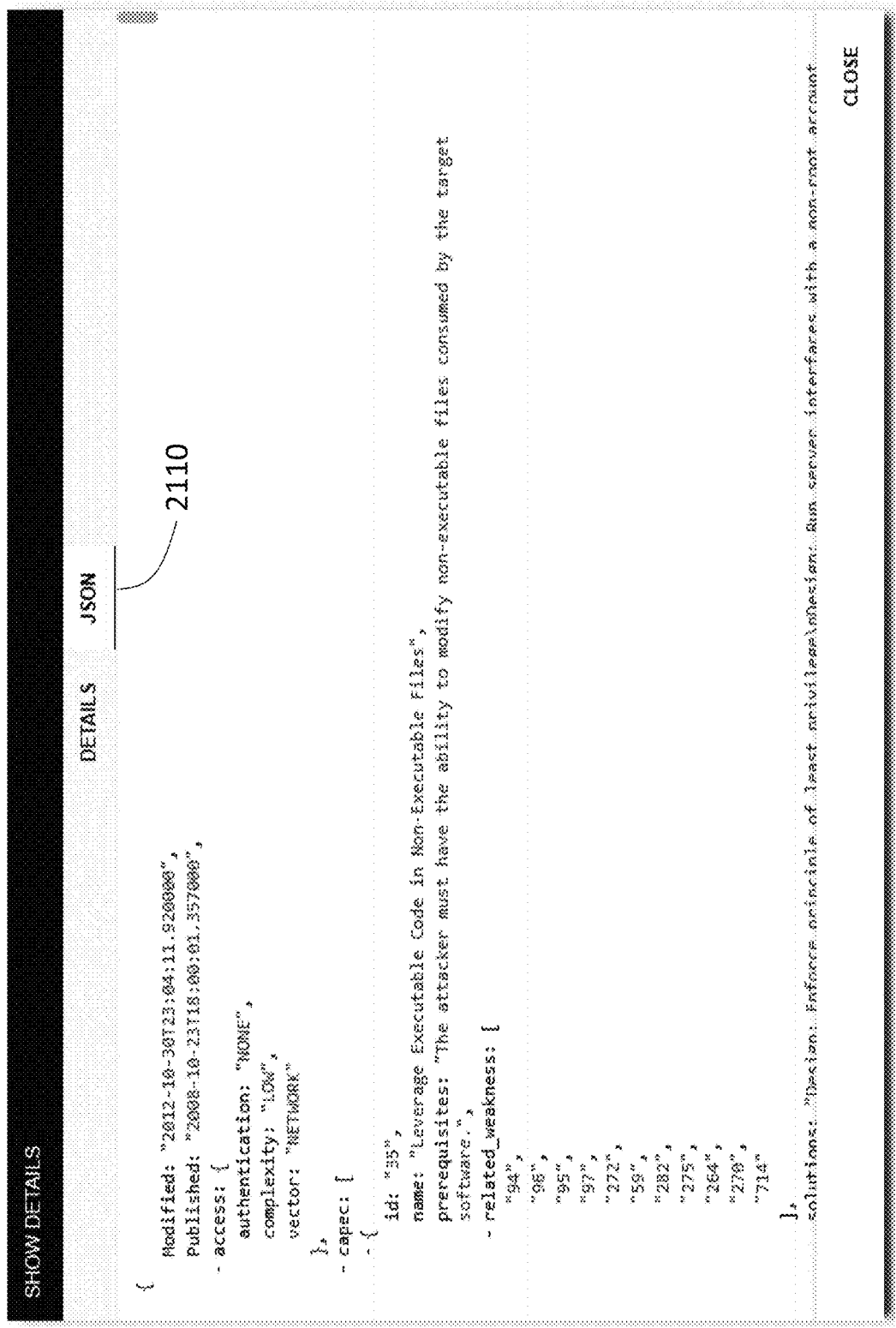
FIG. 21 is a screen display of a JSON tab of a show details window that shows details of an action.

Once icon 1850 is selected, the user has the ability to test an action by entering any required or optional parameters for an integration action in the screen display of FIG. 19 and selecting "test action" button 1910 to test it, and the action will be executed as if it were inside of a run book or a playbook or any other area within the cybersecurity incident management platform. Test information will be displayed in the table view defined in the action definition file, as shown in the "details" tab display of FIG. 20 (step 1680 of FIG. 16). JSON view will display the entire output of the integration action in JSON format, as shown in the "JSON" tab display of FIG. 21 (step 1690), thereby providing the option, just like any other action executed in the cybersecurity incident management platform, to view the raw JSON that was returned by that file, so that the integration action can be confirmed to be acting as expected. Just like any other integration action, whether it's created through the open integration framework or created by the cybersecurity incident management platform, these JSON fields can be passed by the user to future actions. For example, the user can embed this new action, this new integration inside of a run book, and take the information and pass it on to future actions.

Two example files are added below for reference.

Integration Definition File (VirusTotal)
name: 'VirusTotal'
version: '1.0' icon:
data:image/png;base64,
iVBORw0KGgoAAAANSUhEUgAAAAA8RnWXAA
AABmJ LR0 . . . [snip . . . ]QMq1
BbQK47AAAAAASUVORK5CYII=
script:
  type: python
  test_connection code: |
  import json
  import argparse
  import requests
  import sys
  try:
    parser=argparse.ArgumentParser( )
    parser.add_argument('--api_key', help='api_key, REQUIRED', required=True)

```
parser.add_argument('--proxy_url', help='proxy_url',
    required=False)
args, unknown=parser.parse_known_args( )
params={"apikey": args.api_key, 'url': 'google.com'}
end_point="https://www.virustotal.com/vtapi/v2/url/
    scan"
session=requests.Session( )
if args.proxy_url is not None:
    proxies={'http':    args.proxy_url,    'https':
        args.proxy_url}
else:
    proxies=None
r=session.post(end    point,    data=params,
    proxies=proxies, timeout=(5, 60))
r.raise_for_status( )
exit(0)
except Exception as e:
    sys.stderr.write((str(e)))
    exit(-1)
docker_repo_tag: 'virustotal:latest'
docker_image_build_commands:
    'pip install—trusted-host pypi.python.org requests virus-
        total'
configuration:
    testable_connection: true
    require_proxy_config: true
    data_attributes:
        api_key:
            label: 'api key'
            type: 'password'
            required: true
Action Definition File (VirusTotal)
integration: 'VirusTotal Open Framework CS'
name: 'scan file'
type: Enrichment
script:
    code: |
        import json
        import argparse
        import virustotal
        from os import listdir
        import subprocess
        import os
        from os.path import isfile, join
        try:
            parser=argparse.ArgumentParser( )
            parser.add_argument('--api_key',    help='api_key,
                REQUIRED', required=True)
            parser.add_argument('--filename',    help='filename,
                REQUIRED', required=True)
            args, unknown=parser.parse_known_args( )
            v=virustotal.VirusTotal(args.api_key)
            report=v.scan(args.filename)
            report.join( )
            assert report.done==True
            result={'Resource UID': report.id, 'Scan UID':
                report.scan_id, 'Permalink': report.permalink,
                'Resource   SHA1':    report.sha1,    'Resource
                    SHA256': report.sha256, 'Resource MD5':
                    report.md5,
                'Resource status': report.status, 'Antivirus total':
                    report.total,
                'Antivirus positives': report.positives, 'Malware':
                    [ ]}
            for antivirus, malware in report:
                if malware is not None:
                    malware_obj={'Antivirus': antivirus[0], 'Anti-
                        virus version': antivirus[1],
                        'Antivirus update': antivirus[2], 'Malware':
                            malware}
                    result['Malware'].append(malware_obj)  print
                        (json.dumps({'filepath':   ['file1',   'file2']'re-
                            port': [result]}))
                    exit(0)
        except Exception as e:
            sys.stderr.write((str(e)))
            exit(1)
fields:
    id: filename
    label: 'file to scan'
    type: fileDetonate
    required: true
    incident artifacts: true
    observables: 'file'
output:
    path: 'filepath.[ ]'
    type: text
    path: 'report.[ ].Antivirus positives'
    type: integer
    path: 'report.[ ].Antivirus total'
    type: text
    path: 'report.[ ].Permalink'
    type: text
    path: 'report.[ ].Resource SHA256'
    type: text
    path: 'report.[ ].Scan UID'
    type: text
    path: 'report.[ ].Resource MD5'
    type: text
    path: 'report.[ ].Resource status'
    type: text
    path: 'report.[ ].Resource UID'
    type: text
    path: 'report.[ ].Malware.[ ].Antivirus version'
    type: text
    path: 'report.[ ].Malware.[ ].Malware'
    type: text
    path: 'report.[ ].Malware.[ ].Antivirus update'
    type: text
    path: 'report.[ ].Malware.[ ].Antivirus'
    type: text
table_view:
    display_name: 'filepath'
    value: 'filepath'
    display_name: 'SHA256'
    value: 'report.[ ].Resource SHA256'
    display_name: 'MD5'
    value: 'report.[ ].Resource MD5'
    display_name: 'Malware'
    value: 'report.[ ].Malware.[ ].Malware'
    display_name: 'Antivirus'
    value: 'report.[ ].Malware.[ ].Antivirus'
```

Certain useful Docker commands are provided below. The following commands may be useful in performing some common actions in Docker on the cybersecurity incident management platform.

Create Docker Image (Python Example):

1. Create a file with name dockerfile inside a dedicated directory:

```
FROM python:2-slim
RUN pip install—trusted-host pypi.python.org requests
suds.
```

2. Inside this directory run:
   docker build-t<my_integration>.
3. If running Docker image is the image can be seen with tag <my_integration>.
4. Now it is possible to use this tag into yaml:
   docker_repo_tag: '<my_integration>:latest'.
Load an image from a tar archive:
   docker load <docker_image.tar/.
Add third-party libraries to the Docker image when building:
   pip install—trusted-host pypi.python.org tenable_io mock==2.0.0 pytest==3.0.4 Sphinx==1.5.1.
List all Docker Images:
   docker image is
Show Docker Disk Usage:
   docker system df.

There has been described a system and method employing an open integration framework of a computerized cybersecurity incident management software platform, in which integrations are defined at an action level for integrating cybersecurity products for performing desired actions into the cybersecurity incident management software platform. While several particular forms of the invention have been illustrated and described, it will be apparent that various modifications and combinations of the invention detailed in the text and drawings can be made without departing form the spirit and scope of the invention. Accordingly, it is not intended that the invention be limited, except as by the appended claims.

What is claimed is:

1. A method for using an open integration framework of a computerized cybersecurity incident management software platform to define integrations at an action level for integrating cybersecurity products provided by a plurality of companies for performing desired actions into the cybersecurity incident management software platform, comprising iteratively performing, for respective ones of the plurality of cybersecurity products, the following steps:
   defining high-level parameters of an integration through an integration definition file, the integration definition file identifying a-one of the plurality of cybersecurity products, provided by one of the plurality of companies, to be called through an application program interface, the parameters defined by the integration definition file including a name of the integration, connection parameters, and identification of a self-contained virtualization in which the integration definition file is configured to be executed; and
   defining one or more actions of the integration through one or more respective action definition files that define details of the one or more actions, the one or more action definition files identifying the integration defined by the integration definition file, the one or more actions requiring use of the one of the plurality of cybersecurity products through the application program interface, the one or more actions being actions to be performed by the one of the plurality of cybersecurity products provided by the one of the plurality of companies, the details defined by each action definition file comprising a name of, and code to be executed by, an action to be performed by the one of the plurality of cybersecurity products, provided by the one of the plurality of companies, identified by the integration definition file;
   through a user interface, electing to add the integration, and then selecting the integration definition file from a set of integration definition files; and through the user interface, electing to add the one or more actions to be performed by the one of the plurality of cybersecurity products identified by the integration definition file, and then selecting the one or more action definition files from a set of action definition files.

2. A method in accordance with claim 1, wherein the self-contained virtualization in which the integration definition file is executed comprises a Docker container.

3. A method in accordance with claim 1, wherein each action definition file is configured to be executed in a respective self-contained virtualization.

4. A method in accordance with claim 3, wherein the self-contained virtualization in which the action definition file is executed comprises a Docker container.

5. A method in accordance with claim 1, further comprising using instructions in YAML for calling the one of the plurality of cybersecurity products through the application program interface.

6. A method in accordance with claim 1, further comprising using JSON to pass data between the one or more actions and other internal components of the cybersecurity incident management software platform.

7. A method in accordance with claim 1, wherein the open integration framework of the cybersecurity incident management software platform supports defining the integration definition file and the one or more action definition files in Python, Perl, Powershell, or Bash.

8. A method in accordance with claim 7, wherein the open integration framework of the cybersecurity incident management software platform supports defining the action definition files through use of one or more libraries associated with Python, Perl, Powershell, or Bash.

9. A non-transitory computer readable medium comprising software that, when executed by a processor, causes the processor to execute an open integration framework of a computerized cybersecurity incident management software platform to define integrations at an action level for integrating a plurality of cybersecurity products provided by a plurality of companies for performing desired actions into the cybersecurity incident management software platform, the open integration framework performing a method comprising iteratively performing, for respective ones of the plurality of cybersecurity products, the following steps:
   defining high-level parameters of an integration through an integration definition file, the integration definition file identifying one of the plurality of cybersecurity products, provided by one of the plurality of companies, to be called through an application program interface, the parameters defined by the integration definition file including a name of the integration, connection parameters, and identification of a self-contained virtualization in which the integration definition file is configured to be executed; and
   defining one or more actions of the integration through one or more respective action definition files that define details of the one or more actions, the one or more action definition files identifying the integration defined by the integration definition file, the one or more actions requiring use of the one of the plurality of cybersecurity products through the application program interface, the one or more actions being actions to be performed by the one of the plurality of cybersecurity products provided by the one of the plurality of companies, the details defined by each action definition file comprising a name of, and code to be executed by, an action to be performed by the one of the plurality of cybersecurity products, provided by the one of the plurality of companies, identified by the integration definition file;

through a user interface, electing to an-add the integration, and then selecting the integration definition file from a set of integration definition files; and through the user interface, electing to add the one or more actions to be performed by the one of the plurality of cybersecurity products identified by the integration definition file, and then selecting the one or more action definition files from a set of action definition files.

10. A computer readable medium in accordance with claim 9, wherein the self-contained virtualization in which the integration definition file is executed comprises a Docker container.

11. A computer readable medium in accordance with claim 9, wherein each action definition file is configured to be executed in a respective self-contained virtualization.

12. A computer readable medium in accordance with claim 11, wherein the self-contained virtualization in which the action definition file is executed comprises a Docker container.

13. A computer readable medium in accordance with claim 9, wherein the method performed by the open integration framework further comprises using instructions in YAML for calling the one of the cybersecurity products through the application program interface.

14. A computer readable medium in accordance with claim 9, wherein the method performed by the open integration framework further comprises using JSON to pass data between the one or more actions and other internal components of the cybersecurity incident management software platform.

15. A computer readable medium in accordance with claim 9, wherein the open integration framework of the cybersecurity incident management software platform supports defining the integration definition file and the one or more action definition files in Python, Perl, Powershell, or Bash.

16. A computer readable medium in accordance with claim 15, wherein the open integration framework of the cybersecurity incident management software platform supports defining the action definition files through use of one or more libraries associated with Python, Perl, Powershell, or Bash.

\* \* \* \* \*